No. 872,723.
PATENTED DEC. 3, 1907.
T. M. GALLAGHER.
CAR TRUCK.
APPLICATION FILED SEPT. 13, 1907.
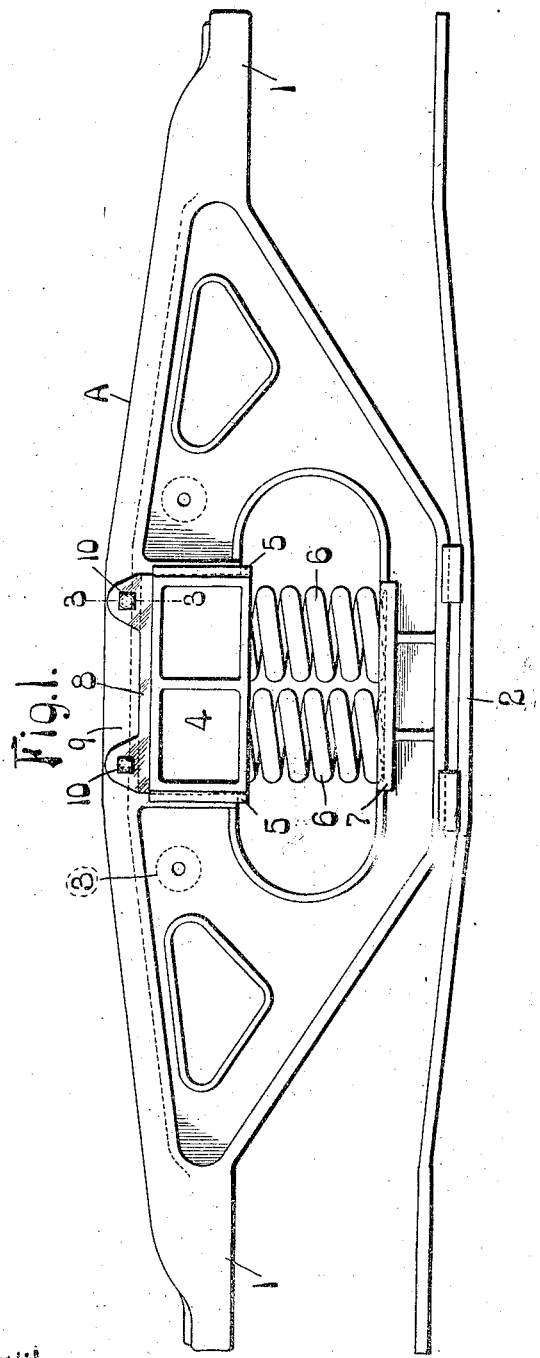
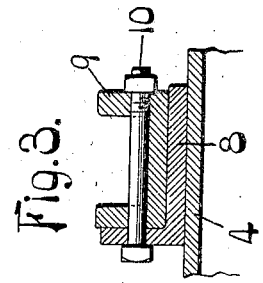
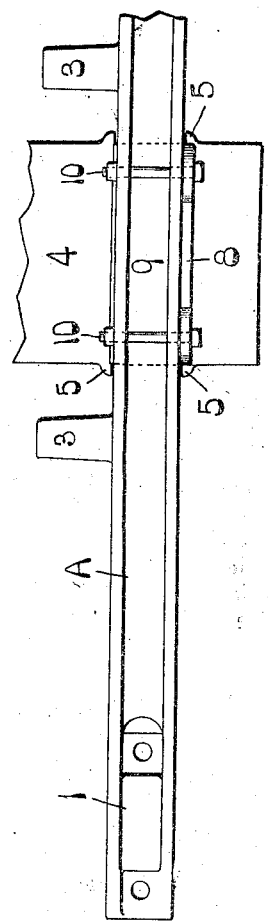
Witnesses
A. J. McCauley
Geo. R. Ladson
Inventor:
Thomas M. Gallagher
by Bakewell & Cornwall, Atty's.

UNITED STATES PATENT OFFICE.

THOMAS M. GALLAGHER, OF OLD ORCHARD, MISSOURI, ASSIGNOR TO SCULLIN-GALLAGHER IRON AND STEEL COMPANY, OF ST. LOUIS, MISSOURI, A CORPORATION OF MISSOURI.

CAR-TRUCK.

No. 872,723.

Specification of Letters Patent.

Patented Dec. 3, 1907.

Application filed September 13, 1907. Serial No. 392,703.

*To all whom it may concern:*

Be it known that I, THOMAS M. GALLAGHER, a citizen of the United States, residing at Old Orchard, St. Louis county, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a side elevational view of a car truck, showing a side frame embodying the features of my invention, parts of the car truck being omitted; Fig. 2 is a plan view; and Fig. 3 is a sectional view taken on the line 3—3 of Fig. 1.

This invention relates to new and useful improvements in car trucks, the object being to provide a car truck in which the bolster and bolster springs can be very easily assembled or removed.

In the accompanying drawings, A indicates one of the truck side frames which is preferably a casting having extensions 1 at its ends, which are adapted to rest on the journal boxes. I do not deem it necessary to illustrate the journal boxes or the means for securing them in position as the same forms no part of this invention. 2 is a tie bar which may be secured to the bottom of the side frame and journal boxes in any suitable manner.

3 indicates tubular extensions formed integral with the side frame, which are adapted to receive a bolt or other suitable device for attaching the brake hangers to the side frame.

It is of course understood that a complete truck includes two side frames and that these side frames are suitably connected to each other.

4 indicates a truck bolster, the end portions of which are slidingly mounted in the upper part of transverse openings in the side frames. Bolster 4 is provided with the usual column guides 5 for a wellknown purpose. Springs 6 are located in the lower portion of the transverse opening in the side frame A and interposed between the bolster and a spring seat 7, the latter being preferably formed integral with the side frame.

When the parts are in their normal position the column guides prevent the bolster from being removed from the truck, but if springs 6 are removed the bolster will drop onto the spring seat and may then be passed through the enlarged lower portion of the transverse opening in the side frame.

One of the features of my invention consists in facilitating the removal of the truck springs 6, which are normally under compression. To this end I arrange a filler block 8 between the bolster and the top chord 9 of the side frame. The filler 8 is removably secured in position by means of bolts 10, which pass through the top chord of the side frame. This filler block may be very easily applied after the car body has been mounted on the truck, because the weight of the car body will move the bolster downwardly, thereby placing the springs 6 under compression and leave a clear space between the bolster and top chord 9 of the side frame.

In removing the bolster from the truck, the first step is to remove the filler 8; the bolster is then lifted, and the springs are removed, and thereafter the bolster is dropped into the enlarged part of the openings in the side frames and passed through one of said openings.

The top chord or compression member of the side frame is preferably in the form of a channel having its flanges projecting upwardly. A compression member of this shape is very strong, it provides a large bearing surface for the filler block 8, and is not difficult to form in the process of casting.

Having thus described the invention, what is claimed as new and desired to be secured by Letters Patent is:

1. A side frame for car trucks having an opening for the reception of a bolster and bolster springs, a portion of said opening being enlarged, and a removable member arranged in the upper portion of said opening to form a filler between the upper edge of the opening and the upper side of the bolster; substantially as described.

2. A cast metal side frame for car trucks having an opening for the reception of a bolster and bolster springs, a portion of said opening being enlarged, a spring seat formed integral with the side frame, and a removable member arranged in the upper portion of said opening to form a filler between the upper edge of the opening and the upper side of the bolster; substantially as described.

3. In a car truck, side frames, each having an opening, a portion of which is enlarged, a bolster mounted in said openings, spring seats, springs interposed between said bolster and spring seats, and removable fillers interposed between the bolster and the upper walls of said openings; substantially as described.

4. In a car truck, side frames, each having an opening, a portion of which is enlarged, a bolster mounted on springs, said bolster being arranged partly within said openings and having column guides which coöperate with the side frames, and removable fillers interposed between the bolster and the upper walls of said openings; substantially as described.

5. In a car truck, side frames, each having an opening, a portion of which is enlarged, a bolster mounted on springs, said bolster being arranged partly within said openings and having column guides which coöperate with the side frames, removable fillers interposed between the bolster and the upper walls of said openings, and means for fastening said fillers in position; substantially as described.

6. In a car truck, side frames each having an opening, a portion of which is enlarged, spring seats formed integral with the side frames, a bolster yieldingly mounted on said spring seats, said bolster being arranged partly within said openings and having column guides which coöperate with the side frames, and removable fillers interposed between the bolster and the upper walls of said openings; substantially as described.

7. In a car truck, cast steel side frames each having an opening, the lower portion of which is enlarged, spring seats formed integral with the side frames, a bolster having column guides which coöperate with the side frames, springs interposed between said bolster and spring seats, the bolster being mounted in the upper portion of said openings, fillers interposed between the bolster and the upper walls of said openings, and bolts connecting said fillers to the side frames; substantially as described.

8. In a car truck, side frames each having an opening, a portion of which is enlarged, spring seats formed integral with the side frames, a bolster having column guides which coöperate with the side frames, springs interposed between said bolster and spring seats, and means arranged between the upper side of the bolster and the upper edges of the openings in the side frames for maintaining said springs under compression; substantially as described.

9. In a car truck, cast side frames, each having an opening, a bolster mounted in said openings and provided with column guides which coöperate with columns on the side frames, spring seats, springs interposed between said bolster and spring seats, and removable fillers arranged between the columns and interposed between the bolster and the upper walls of said openings; substantially as described.

In testimony whereof I hereunto affix my signature in the presence of two witnesses, this tenth day of September 1907.

THOMAS M. GALLAGHER.

Witnesses:
GEORGE BAKEWELL,
WELLS L. CHURCH.